United States Patent
Karlsson et al.

(10) Patent No.: US 8,098,504 B2
(45) Date of Patent: Jan. 17, 2012

(54) CONVERTER STATION FOR CONNECTING AN AC SYSTEM TO AN END OF AN HVDC TRANSMISSION LINE

(75) Inventors: Per H. Karlsson, Ludvika (SE); Sven Berglund, Ludvika (SE); Nils Nordström, Ludvika (SE)

(73) Assignee: ABB Technology Ltd., Zürich (CH)

( * ) Notice: Subject to any disclaimer, the term of this patent is extended or adjusted under 35 U.S.C. 154(b) by 612 days.

(21) Appl. No.: 12/161,385

(22) PCT Filed: Jun. 14, 2006

(86) PCT No.: PCT/SE2006/000713
§ 371 (c)(1),
(2), (4) Date: Nov. 17, 2008

(87) PCT Pub. No.: WO2007/084036
PCT Pub. Date: Jul. 26, 2007

(65) Prior Publication Data
US 2009/0168473 A1   Jul. 2, 2009

Related U.S. Application Data

(60) Provisional application No. 60/759,564, filed on Jan. 18, 2006.

(51) Int. Cl.
*H02M 3/36* (2006.01)
(52) U.S. Cl. .......................................................... 363/35
(58) Field of Classification Search .............. 363/35, 363/37, 38, 68, 51
See application file for complete search history.

(56) References Cited

U.S. PATENT DOCUMENTS

| 395,221 A | 12/1888 | Fouts |
| 4,689,733 A * | 8/1987 | Guth et al. .................. 363/51 |
| 6,570,384 B1 * | 5/2003 | Juhlin .......................... 324/326 |
| 2003/0235026 A1 | 12/2003 | Anheuer et al. |
| 2004/0102109 A1 * | 5/2004 | Cratty et al. ................. 440/113 |

FOREIGN PATENT DOCUMENTS

| EP | 0 519 249 A2 | 12/1992 |
| EP | 0 736 949 A1 | 10/1996 |
| EP | 0736949 A1 | 10/1996 |
| RU | 2089986 C1 | 9/1997 |
| RU | 2002111927 A | 11/2003 |
| WO | WO-90/16104 | 12/1990 |

OTHER PUBLICATIONS

International search report—Oct. 26, 2006.
Decision on grant issued in counterpart Russian patent application 2008133583/09, Feb. 18, 2010.

* cited by examiner

*Primary Examiner* — Adolf Berhane
*Assistant Examiner* — Yemane Mehari
(74) *Attorney, Agent, or Firm* — Venable LLP; Eric J. Franklin

(57) ABSTRACT

A converter station for connecting an AC system to an HVDC transmission line. At least two converters are arranged in two separate converter valve halls. The station includes a separate control device configured to control of each converter and an auxiliary power source configured to provide auxiliary power for each converter. A separate overall control configured to control the overall operation conditions is arranged for each converter making each converter self supporting. The converter valve halls are separated by a substantial space.

16 Claims, 4 Drawing Sheets

CONVERTER STATION FOR CONNECTING AN AC SYSTEM TO AN END OF AN HVDC TRANSMISSION LINE

CROSS-REFERENCE TO RELATED APPLICATIONS

This application claims priority to U.S. provisional patent application 60/759,564 filed 18 Jan. 2006 and is the national phase under 35 U.S.C. §371 of PCT/SE2006/000713 filed 15 Jun. 2006.

TECHNICAL FIELD OF THE INVENTION AND PRIOR ART

The present invention relates to a converter station for connecting an AC system to an HVDC transmission line, said station comprising at least two converters arranged in separate converter valve halls and each having a DC-side for connection to said transmission line and an AC-side connected to said AC system, said converter station comprising a control arrangement adapted to control the operation of said converters, means for providing the converters with auxiliary power as well as means for controlling the overall operation conditions of the converters, such as cooling of components thereof.

The invention is not restricted to any particular levels of voltage between earth and a pole of said HVDC (High Voltage Direct Current) transmission line, but it is especially applicable to such voltages above 500 kV, which means that said transmission line transmits a substantial power and the transmission system to which the converter station belongs requires a very high level of reliability. Neither is the invention restricted to any particular levels of currents through a pole of a said transmission line, but said lines are preferably rated for currents above 1 kA.

The general design of an HVDC transmission system of this type is schematically shown in FIG. 1. It is shown how a converter station 1, 2 is arranged at each end of an HVDC transmission line having two poles, one 4 with positive and one 5 with negative polarity. An AC system 6 is connected to each converter station through transformers 7 for obtaining a suitable level of the voltage of said AC system. The AC system connecting to the station 1 is assumed to be a generating system in the form of any type of power plant with generators of electricity and this converter station is designed to operate as rectifier, whereas the AC system connecting to the converter station 2 is assumed to be a consuming system or network connecting to consumers of electric power, such as industries and communities, and this converter station is assumed to operate as inverter. Each converter station has two converters 8, 9 each having a DC-side thereof connected on one hand to a respective of said two poles 4, 5 and on the other to a DC neutral arrangement 10 in common to the converters and connecting the low voltage side thereof to earth for defining a certain voltage across each converter. The converters include a number of current valves in any known configuration, for instance in a 12-pulse bridge configuration. The converters may be line commutated Current Source Converters in which the switching elements, such as thyristors, are turned off at zero crossing of the AC current in said AC system. The converters may also be forced commutated Voltage Source Converters, in which said switching elements are turn-off devices controlled according to a Pulse Width Modulation (PWM) pattern.

An advantage of an HVDC transmission system with respect to an AC transmission system is that remarkably lower losses result in the transmission line between the two converter stations at each end of this line, whereas the converter stations are mostly more costly in an HVDC transmission system than in an AC transmission system. HVDC transmission systems are therefor mostly used to transmit much power, often in the order of some GW. This means that the consequence for the connected AC systems can be very severe if the whole or a part of such a transmission system is tripped, i.e. has to be disconnected, for instance as a consequence of an earth fault. A trip of such a large power transmission could have devastating effects on the power network with power disturbances, e.g. load shedding and blackout, as a consequence, so that the main issue of such a transmission system and by that also of a converter station thereof is the reliability of the transmission. Faults can always occur but the consequences should be minimized, i.e. the power loss and physical damage should be minimized.

Said auxiliary power means mentioned in the introduction are means for providing different type of equipments, such as cooling equipment for cooling the converter valves, with power, and a dropout of such auxiliary power would in a very short time, such as in the order of 10 seconds, result in a necessity to shut down at least parts of the converter station.

Known converter stations of the type defined in the introduction having at least two separate converter valve halls are having these valve halls built next to each other or with a control building therebetween for sharing said control arrangement and auxiliary power means as well as said means for controlling the overall operation conditions of the converters. In case something drastic happens, such as an earthquake, a fire or the like, there is a risk that more than one building is affected, so that the power and economic losses are increased with respect to the case of such an event restricted to only one building.

SUMMARY OF THE INVENTION

The object of the present invention is to provide a converter station of the type defined in the introduction, in which the reliability of the transmission is increased with respect to such converter stations already known. This object is according to the invention obtained by providing such a converter station, in which said control arrangement comprises a separate control device for the control of each converter of the converter station, the station has a separate means for providing auxiliary power for each converter, a separate means for controlling the overall operation conditions is arranged for each converter making each converter self supporting, and said converter valve halls are separated by a substantial space therebetween with each said control device and means arranged in connection with a respective hall.

Such a physical separation of the valve halls with space in between made possible thanks to the self supporting design of each converter reduces the risk that more than one building is affected by a fire or the like in that building and the power and economic loss is thereby minimized. This also makes it easier to build one valve hall at a time, and the power transmission can start earlier and be enlarged over time by building further valve halls thereto.

According to an embodiment of the invention said converter station has at least three said converters each arranged in a separate valve hall, the station comprises at least as many separate auxiliary power sources as the number of converters, one assigned to each converter, and these auxiliary power sources are connected to act as backup for each other in the sense that if the auxiliary power source assigned to one converter fails an auxiliary power source assigned to any of the other converters is connected to deliver auxiliary power to also said one converter while providing redundancy through the remaining auxiliary power source or auxiliary power sources. This means that auxiliary power may continue to be provided to equipment in said converter station even with an interruption in any of the auxiliary power sources or rooms connected to the converter.

According to another embodiment of the invention the converter station has four converters and four said auxiliary power sources acting as backup for each other, which may be the case for a bipolar HVDC transmission system having two converters connected in series between the DC neutral arrangement and each pole for being able to obtain voltages in the order of 600 kV or higher between earth and a said pole. This means that if one of the four sources fails only this particular pole will be affected. This pole will continue to operate at full load but without redundancy. The other pole will remain in operation at full load and with full redundancy.

According to another embodiment of the invention two of the power sources are external power sources connected to the converter station through a power network being independent of the operation of said transmission system and two of the power sources are power sources included in the converter station.

According to another embodiment of the invention said auxiliary power sources are adapted to have a voltage of 5 kV-15 kV, such as approximately 10 kV. By distributing the converter power at 10 kV (and not at a lower voltage) cable dimensions are decreased.

According to another embodiment of the invention the converter station has two said converters connected in series between a positive polarity pole of said transmission line and a neutral bus being earthed and two said converters connected in series between a negative polarity pole of the transmission line and said neutral bus.

According to a further embodiment of the invention each said converter comprises a series connection of a plurality of converter valves and a plurality of members connected to an AC-side of the converter by each connecting to points of said series connection between subsequent said converter valves for leading out from the converter valve hall to transformers, and each said converter comprises said connecting members on both of two opposite sides of said converter valves and by that transformers on opposite sides of said converter hall. This means that the converter valves of such a converter of the converter station may be arranged in a more compact way, such as quadruple valves instead of double valves and still obtain that there is sufficient electrical insulation distance between connections to transformers, since these connections are fewer than before on each side of the converter hall. It is then advantageous to have half said transformers belonging to each converter arranged on one side of the converter hall and a half on the other side thereof. Combining this with an arrangement of said valves in columns of twice as many converter valves means that the length of a said converter valve hall may be reduced to substantially the half while saving space at the same time as the electrical bus work between the converter and the transformers is simplified.

According to another embodiment of the invention each said converter comprises a said series connection of at least four said converter valves arranged on top of each other in one column, and said connecting members for the AC-side connects to points of said series connection between every second converter valve, such as between the first and second, the third and fourth and so on.

According to another embodiment of the invention said series connection of converter valves has for each said converter four converter valves and one said connecting member for the AC-side on each of two opposite sides of said column and by that on opposite sides of said converter valve hall. This means only one said connecting member on each side of the column of the converter valves for four such converter valves.

According to another embodiment of the invention each converter of the converter station comprises three said columns of four converter valves connected in series arranged in a row and connected in parallel with each other, and each column has one said member connecting to said AC-side on each of two opposite sides of said row. This means three connecting members on each side of said row instead of six for such a 12-pulse configuration of known converters.

According to another embodiment of the invention the converter comprises a plurality of surge arresters connected in series between said two DC-side ends of the converter valve series connection with one surge arrester connected in parallel with each converter valve, the series connection of surge arresters has a first part arranged on one side of said series connection of converter valves and a subsequent second part arranged on the opposite side of said series connection of converter valves, and said two parts are interconnected by a line leading from one side to the other through a free space between said two converter valves. By providing such a free space between two subsequent converter valves of said series connection of surge arresters by simply omitting one layer or half such a layer, the total height of the column of superimposed converter valves will only increase slightly.

According to another embodiment of the invention each converter has on one side of the converter valve hall Y-transformers connected to said connecting members and on the other side of the converter valve hall Δ-transformers connected to said connecting members, and said Y-transformers and said Δ-transformers are interconnected by conductors extending across a roof of said converter hall. "Conductors" may here be of any type, such as rails, lines or the like. This constitutes a simple way of connecting said Y-transformers and Δ-transformers to each other for obtaining the quality required of the direct voltage on the direct voltage transmission line. This also makes it easy to remove a transformer in case of failure thereof.

According to another embodiment of the invention the converter station is adapted for connecting an AC-system to an HVDC transmission line adapted to have a voltage between a pole thereof and earth exceeding 200 kV, advantageously exceeding 500 kV, preferably being 600 kV-1 500 kV, and most preferred being 600 kV-1 000 kV. The invention is the more interesting the higher said voltage is, although it may also be favourable for voltages being low in this context, which means for instance in the order of 200 kV.

The invention also relates to an HVDC (High Voltage Direct Current) transmission system having converter stations according to the invention, which may benefit from the favourable construction of said converter stations and increased reliability thereof.

Further advantages as well as advantageous features of the invention will appear from the following description of embodiments thereof.

BRIEF DESCRIPTION OF THE DRAWINGS

With reference to the appended drawings, below follows a specific description of a converter according to the prior art as well as converter stations according to embodiments of the present invention.

In the drawings.

BRIEF DESCRIPTION OF A CONVERTER IN A CONVERTER STATION ACCORDING TO THE PRIOR ART

Figure 1:
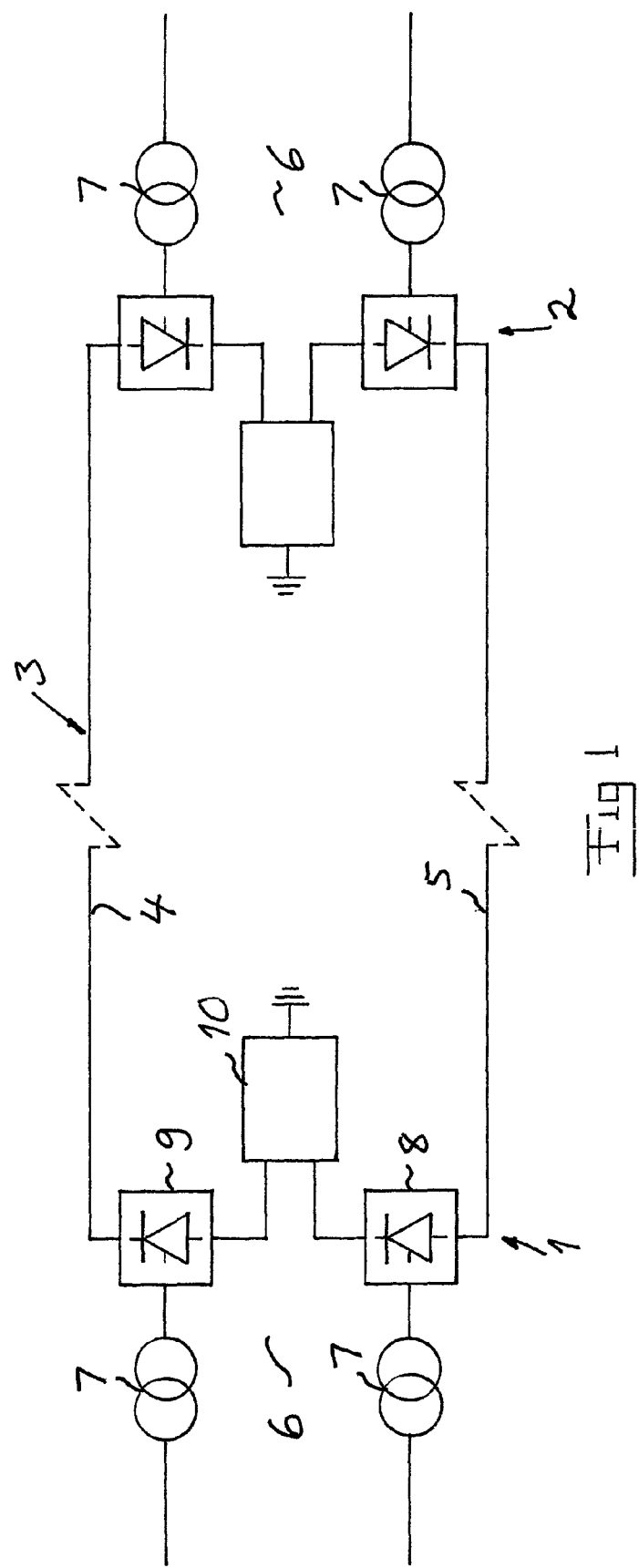
FIG. 1 is a very schematic view illustrating an HVDC (High Voltage Direct Current) transmission system with converter stations, which may be of the type according to the invention.
Figure 2:
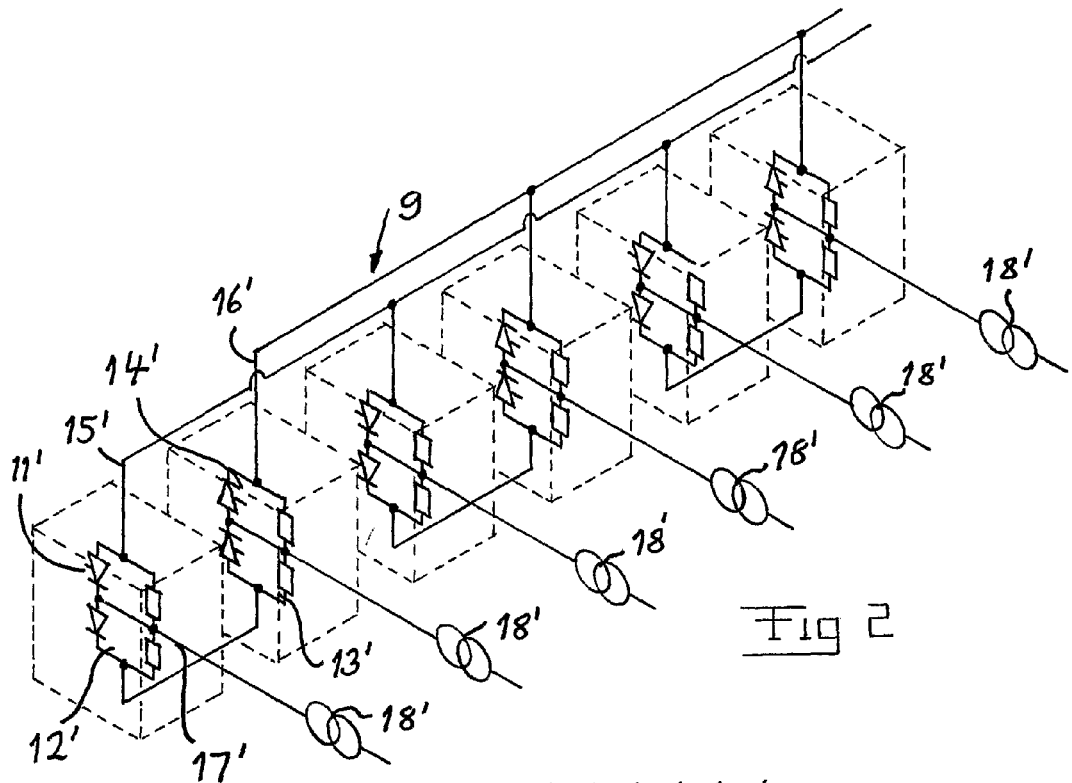
FIG. 2 is a very schematic view illustrating a known converter with a 12-pulse configuration for such a converter station.

FIG. 2 illustrates a known so-called 12-pulse bridge converter for converting alternating voltage into direct voltage and conversely in a converter station of an HVDC transmission system of the type shown in FIG. 1. This converter has three series connections of four converter valves 11', 12', 13' and 14' each, and said series connections are connected in parallel with each other for connecting with opposite ends 15' and 16' to high potential and low potential of said DC-side, respectively. Each said series connection is here arranged in two columns having each two superimposed converter valves. It is shown how points between the two converter valves of each column are provided with members 17' for connecting them to a transformer 18' each, so that in this way six transformers are arranged on one side of the row of converter valve columns resulting in a long a complicated electrical bus work inside the valve hall and use of a large area for said valve hall. Electrical insulation distance (air distance) between each connection is necessary and will need extra space and air also contributing to making said valve hall longer.

DETAILED DESCRIPTION OF EMBODIMENTS OF THE INVENTION

Figure 3:
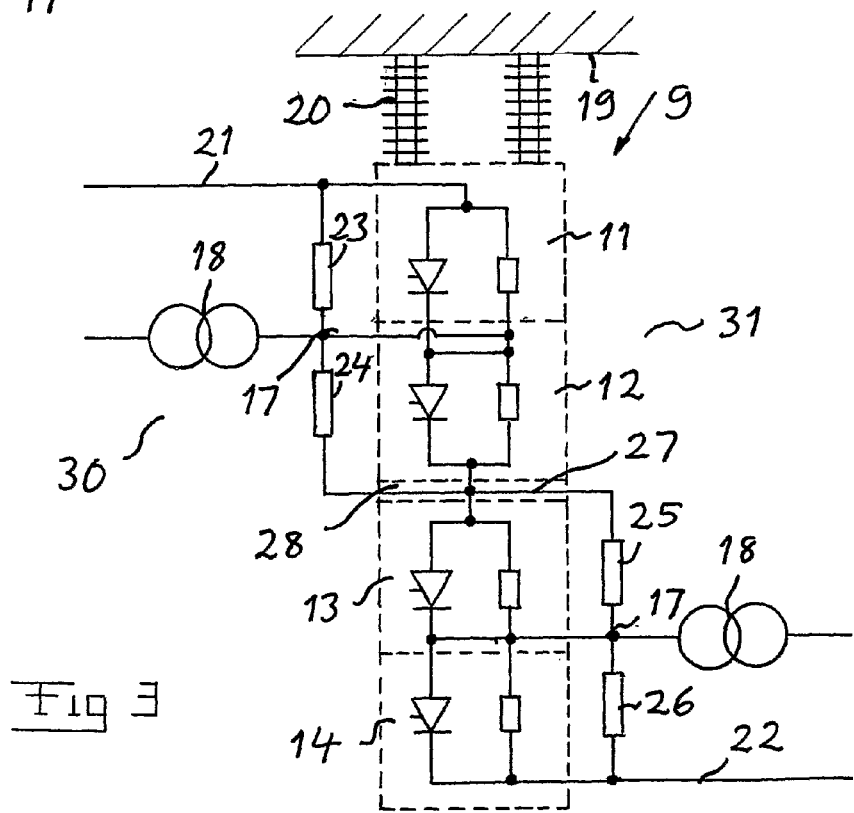
FIG. 3 is a simplified end view of a converter in a converter station according to an embodiment of the invention.

FIG. 3 illustrates schematically an advantageous structure of a converter in a converter station according to the invention. This converter is shown from one end, so that only one of three columns arranged in a row is shown. Accordingly, this is a 12-pulse bridge converter having the series connection of four converter valves 11-14 arranged in one column on top of each other. Such a column is here shown to be insulated with respect to the roof 19 of a converter valve hall by an insulation member 20. The DC-side of the converter is connected to said converter column on opposite sides thereof by a connection 21 to a pole of the HVDC transmission line and a connection 22 to a neutral bus of the converter station. Surge arresters 23-26 are connected in series between said DC-connections 21, 22 with one surge arrester connected in parallel with each converter valve for protection thereof against over-voltages. One part of the series connection of surge arresters, namely two of them, 23 and 24 are arranged on one side of the converter valve column and the other part on the other side of the column by being interconnected by a line 27 leading from one side to the other through a free space 28 between two said converter valves 12, 13. Said line is formed by a rail, cable or the like. Each converter valve comprises a plurality of superimposed layers comprising power semiconductors, and said free space 28 is preferably formed by leaving a distance between two subsequent converter valves of approximately half such a layer.

It is shown how members 17 connecting to points of the series connection of converter valves between subsequent converter valves may in this way be arranged on opposite sides 30, 31 of the converter for connecting to transformers 18 on opposite sides thereof resulting in the advantages described above.

Figure 4:
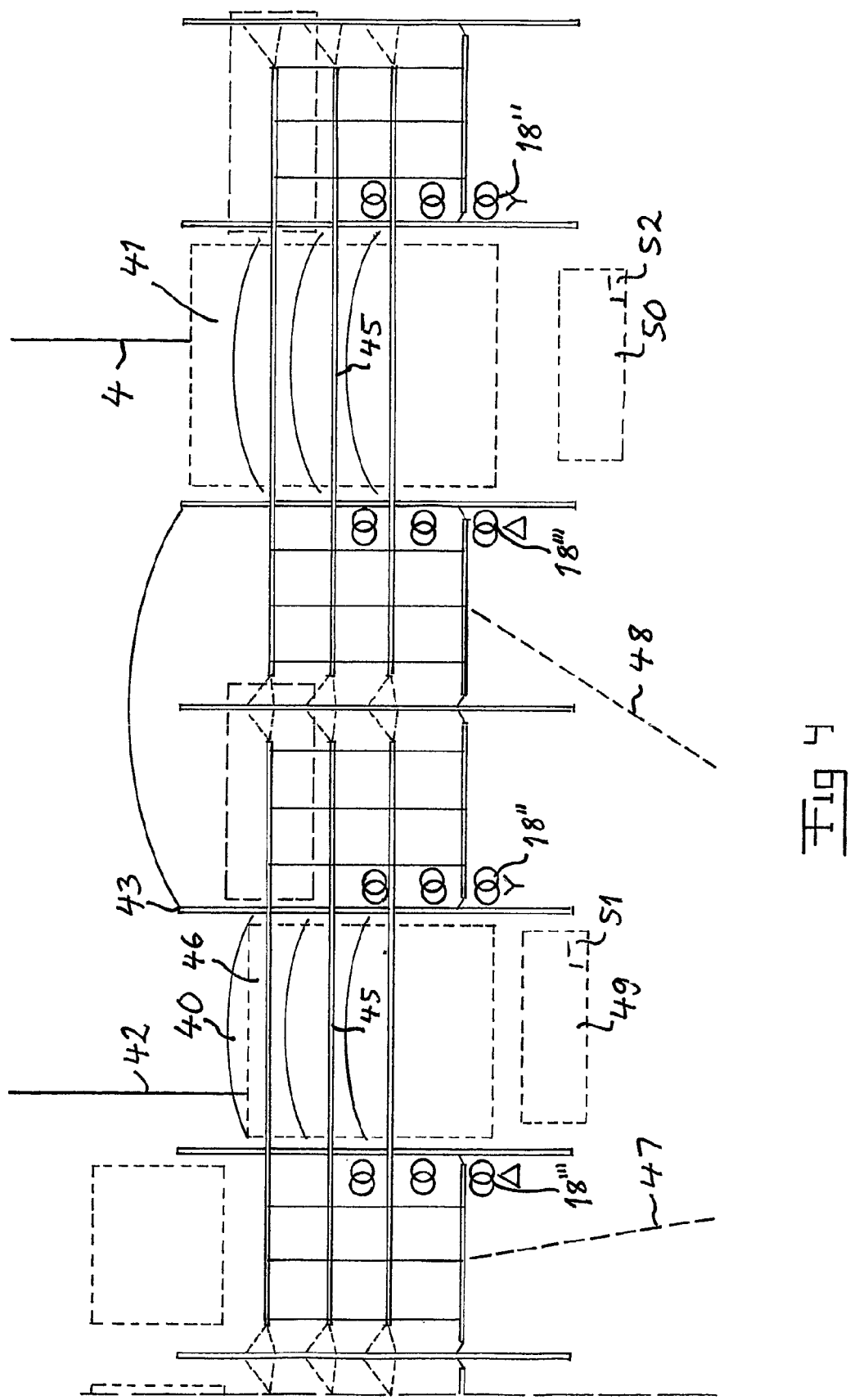
FIG. 4 is a simplified view illustrating the general structure of a converter station according to an embodiment of the invention.

FIG. 4 illustrates very schematically a part of a converter station according to an embodiment of the present invention. The converter station has four converters, and the converter valve halls 40, 41 for the two converters connected in series between a neutral bus of said DC neutral arrangement and the pole 4 with positive polarity are shown in the figure, and two further such converter valve halls are arranged to the left of these as seen in the figure in a corresponding arrangement between said neutral bus 42 and the negative polarity pole (not shown) of the trans-mission line. The converter in the first converter valve hall 40 is adapted to create a voltage of approximately 400 kV between the output 43 thereof and said neutral bus 42 while the converter of the other converter valve hall 41 is adapted to raise the voltage between said pole 4 and the neutral bus 42 to approximately 800 kV.

It is shown how three Y-transformers 18'' are arranged on one side of each converter valve hall and connecting to the converter and Δ-transformers 18''' are arranged on the other side of the converter valve hall and connecting to the converter. The Y-transformers and the Δ-transformers belonging to the same converter are interconnected by conducting rails 45 extending across a roof 46 of the converter valve hall. It is schematically illustrated how AC lines 47, 48 are connected to the station by being connected to these transformers.

Each converter is self supporting in the sense that it has a separate control arrangement 49, 50 adapted to control the operation of the converter as well means for providing the converters with auxiliary power (will be shown in FIG. 5 and discussed below) as well as means 51, 52 for controlling the overall operation conditions of the converters, such as cooling of components thereof. This also makes it possible to arrange the converter valve halls 40, 41 with a considerable space therebetween, such as 50 m or more, reducing the risk that more than one building is affected would one such converter valve hall building be subjected to fire or the like, and power and economic loss is thereby minimized.

Figure 5:
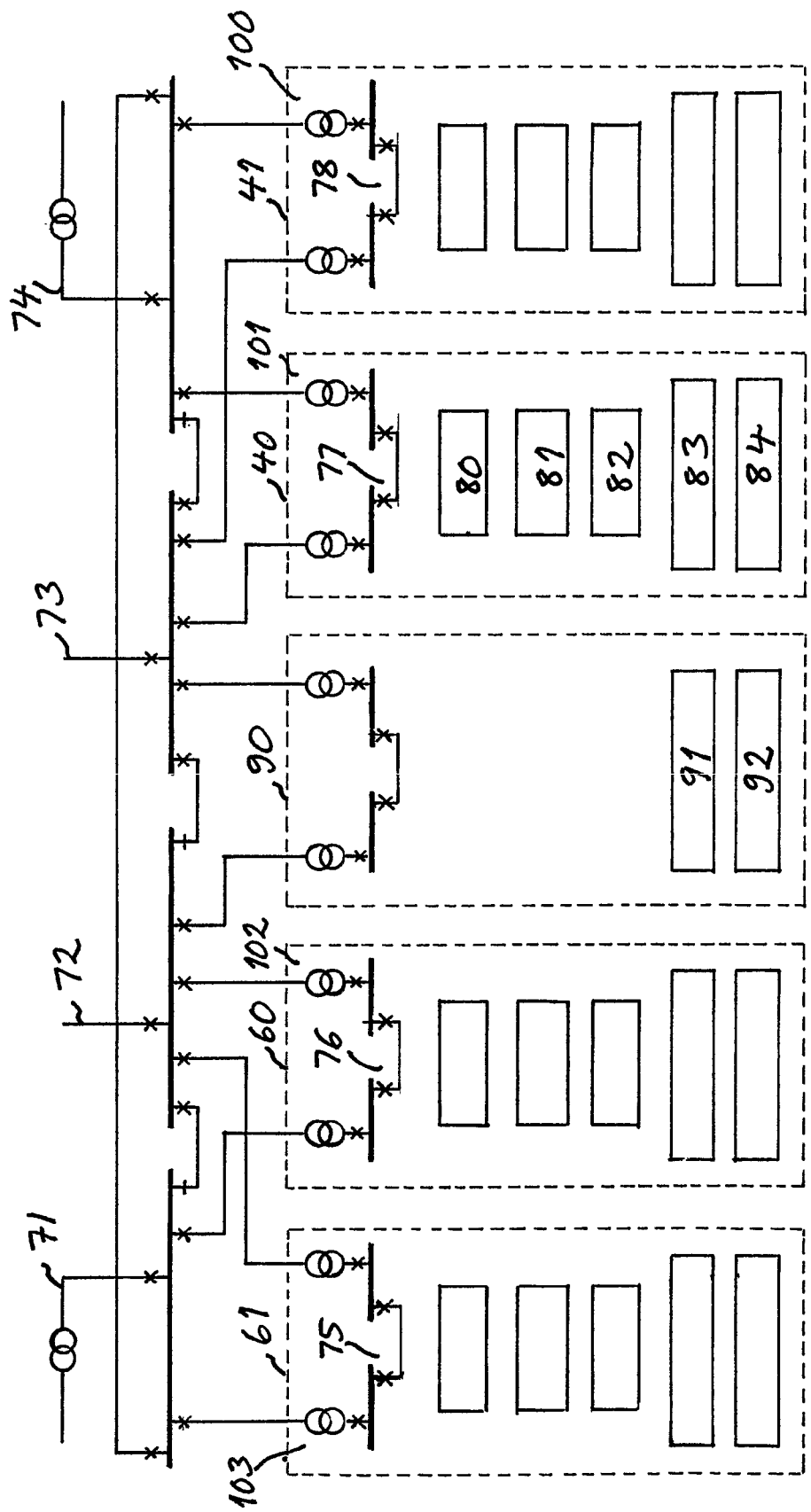
FIG. 5 is a schematic view illustrating how different equipments are arranged in a converter station according to an embodiment of the invention and how different connections are made to these equipments.

FIG. 5 schematically illustrates the general structure of a converter station according to an embodiment of the present invention. The converter valve halls 60, 61 connected between the neutral bus and the negative pole of the HVDC transmission line are here also shown. The station comprises a separate auxiliary power source 71-74 for each converter 100-103, and these auxiliary power sources are connected to act as backup for each other in the sense that if the auxiliary power source assigned to one converter fails an auxiliary power sources assigned to any of the other converters is connected to deliver auxiliary power to also said converter while providing redundancy through the remaining auxiliary power sources. Two of the power sources 72, 73 are external power sources connected to the converter station through a power network being independent of the operation of the transmission system and two 71, 74 of the power sources are power sources included in the converter station. The auxiliary power sources are adapted to have a voltage of approximately 10 kV, and each converter has its own 10 kV switch gear 75-78 for further low voltage distribution within the converter. This means that the delivery of auxiliary power to the converters may continue even with an interruption in any of the auxiliary power rooms connected to the converter.

It is further shown how each converter has a converter valve cooling equipment 80, an equipment 81 for cooling transformers associated with these valves, means 82 for ventilation and lightening of the converter valve hall, battery chargers 83 and arrangement 84 for heating and ventilating a service building.

The converter station also comprises a station building 90 with station battery chargers 91 and station control building heating, ventilation and lightening arrangement 92.

The invention is of course not in any way restricted to the embodiments described above, but many possibilities to modifications thereof would be apparent to a person with ordinary skill in the art without departing from the basic idea of the invention as defined in the appended claims.

The station may for example have more than two converter valve halls between a neutral bus and a pole. It is also obvious that the converter station may be connected to an HVDC transmission line having only one pole.

The invention claimed is:

1. A converter station for connecting an AC system to an end of an HVDC transmission line, said station comprising:
   at least two converters arranged in separate converter valve halls and each having a DC-side for connection to the same end of said HVDC transmission line and an AC-side connected to said AC system,
   a control arrangement adapted to control the operation of said converters, said control arrangement comprises a separate control device for the control of each converter of the converter station,
   auxiliary power supplies configured to provide the converters with auxiliary power, wherein one of the auxiliary power supplies is provided for each converter, and
   an overall control configured to control an overall operation conditions of the converters, wherein a separate overall control is configured to control the overall operation conditions of each converter making each converter self supporting,
   wherein said converter valve halls are separated by a substantial space therebetween with each said control device and overall control arranged in connection with the respective hall.

2. The converter station according to claim 1, wherein the converter station comprises at least three said converters each arranged in a separate converter valve hall, wherein the converter station comprises at least as many separate auxiliary power sources as the number of converters, one assigned to each converter, and wherein these auxiliary power sources are connected to act as backup for each other in the sense that if the auxiliary power source assigned to one converter fails an auxiliary power source assigned to any of the other converters is connected to deliver auxiliary power to also said one converter while providing redundancy through the remaining auxiliary power source or auxiliary power sources.

3. The converter station according to claim 2, wherein the converter station comprises four converters and four said auxiliary power sources acting as backup for each other.

4. The converter station according to claim 3, wherein two of the power sources are external power sources connected to the converter station through a power network being independent of the operation of said transmission system and two of the power sources are power sources included in the converter station.

5. The converter station according to claim 3, wherein the converter station comprises two said converters connected in series between a positive polarity pole of said transmission line and a neutral bus being earthed and two said converters connected in series between a negative polarity pole of the transmission line and said neutral bus.

6. The converter station according to claim 2, wherein said auxiliary power sources are adapted to have a voltage of 5 kV -15 kV.

7. The converter station according to claim 1, wherein each said converter comprises a series connection of a plurality of converter valves and a plurality of members connecting to an AC-side of the converter by each connecting to points of said series connection between subsequent said converter valves for leading out from the converter hall to transformers, and wherein each said converter comprises said connecting members on both of two opposite sides of said converter valves and by that transformers on opposite sides of said converter hall.

8. The converter station according to claim 7, wherein half of said transformers belonging to each converter is arranged on one side of the converter hall and a half on the other side thereof.

9. The converter station according to claim 7, wherein each said converter comprises a said series connection of at least four said converter valves arranged on top of each other in one column, and wherein said connecting members for the AC-side connects to points of said series connections between every second converter valve.

10. The converter station according to claim 9, wherein for each said converter said series connection of converter valves has four converter valves and one said connecting member for the AC-side on each of two opposite sides of said column and by that on opposite sides of said converter valve hall.

11. The converter station according to claim 7, wherein each converter thereof comprises three said columns of four converter valves connected in series arranged in a row and connected in parallel with each other, and wherein each column has one said member connecting to said AC-side on each of two opposite sides of said row.

12. The converter station according to claim 7, wherein each converter thereof comprises a plurality of surge arresters connected in series between said two DC-side ends of the converter valve series connection with one surge arrester connected in parallel with each converter valve, wherein the series connection of surge arresters has a first part arranged on one side of said series connection of converter valves and a subsequent second part arranged on the opposite side of said series connection of converter valves, and wherein said two parts are interconnected by a line leading from one side to the other through a free space between two said converter valves.

13. The converter station according to claim 12, wherein for each converter of the station each converter valve comprises a plurality of superimposed layers comprising power semiconductors, and wherein said free space is formed by making a distance between two subsequent said converter valves of approximately half such a layer or one such layer.

14. The converter station according to claim 7, wherein each converter has on one side of the converter valve hall Y-transformers connected to said connecting members and on the other side of the converter valve hall Δ-transformers connected to said connecting members, and wherein said Y-transformers and said Δ-transformers are interconnected by conductors extending across a roof of said converter hall.

15. The converter station according to claim 1, wherein the converter station is adapted for connecting an AC system to a HVDC transmission line adapted to have a voltage between a pole thereof and earth exceeding 200 kV.

16. A high voltage direct current transmission system, comprising:
   at least one converter station according to claim 1.

* * * * *

UNITED STATES PATENT AND TRADEMARK OFFICE
CERTIFICATE OF CORRECTION

PATENT NO. : 8,098,504 B2
APPLICATION NO. : 12/161385
DATED : January 17, 2012
INVENTOR(S) : Per H. Karlsson et al.

Page 1 of 1

It is certified that error appears in the above-identified patent and that said Letters Patent is hereby corrected as shown below:

Title Page correct the priority information item (22) from:

"(22)   PCT Filed:    Jun. 14, 2006"

to

--(22)   PCT Filed:    Jun. 15, 2006--

Signed and Sealed this
Twelfth Day of February, 2013

Teresa Stanek Rea
*Acting Director of the United States Patent and Trademark Office*